(12) United States Patent
Wu

(10) Patent No.: US 12,482,070 B2
(45) Date of Patent: Nov. 25, 2025

(54) IMAGE RESTORATION METHOD AND IMAGE RESTORATION DEVICE

(71) Applicant: VIVOTEK INC., New Taipei (TW)

(72) Inventor: Jen-Chih Wu, New Taipei (TW)

(73) Assignee: VIVOTEK INC., New Taipei (TW)

( * ) Notice: Subject to any disclaimer, the term of this patent is extended or adjusted under 35 U.S.C. 154(b) by 436 days.

(21) Appl. No.: 18/107,023

(22) Filed: Feb. 8, 2023

(65) Prior Publication Data

US 2023/0316477 A1 Oct. 5, 2023

(30) Foreign Application Priority Data

Mar. 23, 2022 (TW) ................................. 111110707

(51) Int. Cl.
*G06T 5/73* (2024.01)
*G06T 5/50* (2006.01)
*G06T 7/194* (2017.01)
*G06V 10/22* (2022.01)

(52) U.S. Cl.
CPC ............... *G06T 5/50* (2013.01); *G06T 7/194* (2017.01); *G06V 10/225* (2022.01); *G06T 2207/20221* (2013.01); *G06V 2201/07* (2022.01)

(58) Field of Classification Search
CPC . G06T 5/50; G06T 7/194; G06T 2207/20221; G06T 5/73; G06T 2207/10016; G06T 2207/30201; G06T 2207/30232; G06V 10/225; G06V 2201/07; G06V 40/161
See application file for complete search history.

(56) References Cited

U.S. PATENT DOCUMENTS 8,369,650 B2 2/2013 Zamfir

FOREIGN PATENT DOCUMENTS

| CN | 111325699 A | * | 6/2020 | ............... G06T 5/77 |
| CN | 113496470 A | * | 10/2021 | ............... G06T 7/187 |
| TW | 202109449 A | * | 3/2021 | ............... G06T 5/20 |
| TW | 202143120 A | | 11/2021 | |
| WO | 2005/109853 A1 | | 11/2005 | |

* cited by examiner

*Primary Examiner* — Vu Le
*Assistant Examiner* — Lei Zhao
(74) *Attorney, Agent, or Firm* — Winston Hsu

(57) ABSTRACT

An image restoration method is applied to an image restoration device and includes acquiring an analyzing image containing a region of interest and a background region, utilizing a first restoration function to calibrate the region of interest and generate a calibrated region of interest, and combining the calibrated region of interest with the background region via a relative position between the region of interest and the background region for providing a restoration image.

20 Claims, 6 Drawing Sheets

I1

I2

IMAGE RESTORATION METHOD AND IMAGE RESTORATION DEVICE

BACKGROUND OF THE INVENTION

1. Field of the Invention

The present invention relates to an image restoration method and an image restoration device, and more particularly, to an image restoration method and an image restoration device of providing preferred image restoration efficiency.

2. Description of the Prior Art

An original image captured by a surveillance camera may be distorted due to ambient light, lens features, parameter changes of the sensor, compression and transmission of image data, or back-end image processing. The distorted image is processed by an image restoration program to provide high quality image for being watched by the user, or to perform related image analysis and detection/identification procedures. The conventional image restoration program finds out a transformation function that transforms the original image into the distorted image, and then finds out an inverse function of the transformation function as being the restoration function. The restoration function generated by the conventional image restoration program performs image restoration on the whole distorted image with the same restoration parameters. However, the distorted image may contain objects with different attributes such as vehicles, pedestrians, and buildings; if the objects with different attributes in the image are restored by the same restoration parameters, details of some objects are difficult to restore to the correct and clear level. Therefore, design of an image restoration method of identifying objects with different attributes in the image and improving an restoration effect of each object with the specific attribute is an important issue in the related surveillance camera industry.

SUMMARY OF THE INVENTION

The present invention provides an image restoration method and an image restoration device of providing preferred image restoration efficiency for solving above drawbacks.

According to the claimed invention, an image restoration method is applied to an image restoration device with an image receiver and an operation processor. The image restoration method includes acquiring an analyzing image containing at least one region of interest and a background region received by the image receiver, utilizing a first restoration function to calibrate the at least one region of interest and generate at least one calibrated region of interest, and combining the at least one calibrated region of interest with the background region via at least one relative position between the at least one region of interest and the background region for providing a restoration image.

According to the claimed invention, an image restoration device includes an image receiver and an operation processor. The image receiver is adapted to receive an original image. The operation processor is electrically connected to the image receiver. The operation processor is adapted to transform the original image into an analyzing image containing at least one region of interest and a background region, utilize a first restoration function to calibrate the at least one region of interest and generate at least one calibrated region of interest, and combine the at least one calibrated region of interest with the background region via at least one relative position between the at least one region of interest and the background region for providing a restoration image.

The image restoration device and the image restoration method of the present invention can utilize different restoration functions to respectively restore the region of interest and the background region within the distortion image, or utilize different weights to adjust the weighting ratios of the region of interest and the background region within the restoration function, so that the category and the attribute of the region of interest can be identified and analyzed to acquire the preferred image restoration efficiency. The image restoration device of the present invention can utilize the object detection/identification technology to find out whether the region of interest conforming to the specific category and/or the specific attribute exists in the original image, and the image restoration method can be executed in response to the eligible region of interest; besides, the present invention may analyze whether the control command provided by the input interface, such as the mouse or the keyboard, points toward the region of interest, and then execute the image restoration method when the control command points toward the region of interest. In addition, the image restoration method and the image restoration device of the present invention can improve the clarity of the region of interest within the image or improve the distortion degree of the image on the premise of economizing image data size or video data rate, so as to effectively solve conventional drawbacks of sacrificing the image quality in order to reduce the image data size or the video data rate, while taking into account advantages of small image data size or low video data rate and high resolution of the image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
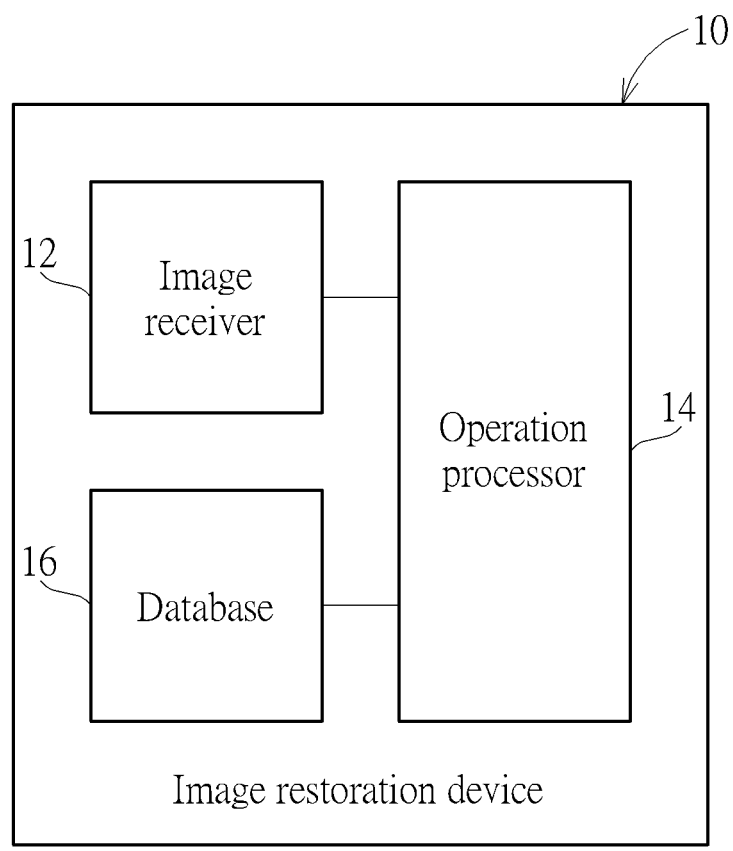
FIG. 1 is a functional block diagram of an image restoration device according to an embodiment of the present invention.
Figure 2:
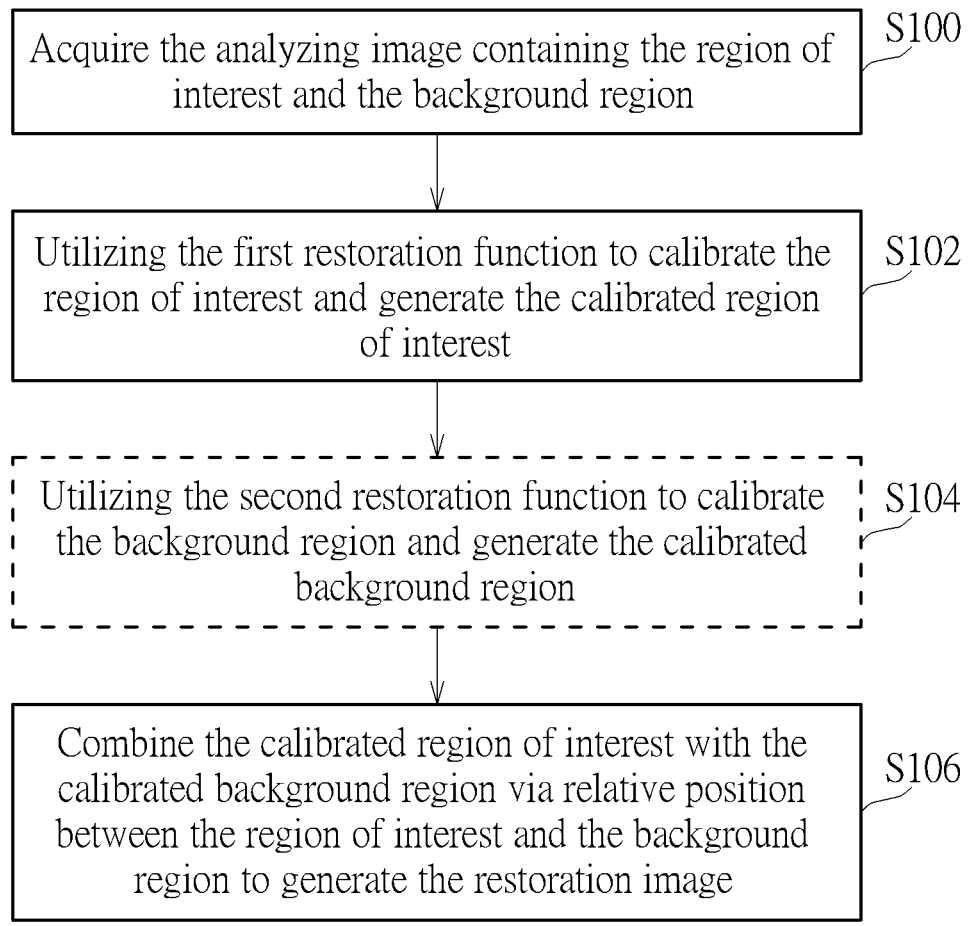
FIG. 2 is a flow chart of an image restoration method according to the embodiment of the present invention.

Please refer to FIG. 1 and FIG. 2. FIG. 1 is a functional block diagram of an image restoration device 10 according to an embodiment of the present invention. FIG. 2 is a flow chart of an image restoration method according to the embodiment of the present invention. The image restoration device 10 can be disposed inside a surveillance camera, or connected to the surveillance camera in a remote manner.

The image restoration device 10 can analyze and restore a surveillance image captured by the surveillance camera to improve an image quality. The image restoration device 10 can include an image receiver 12 and an operation processor 14 electrically connected to each other. The image receiver 12 can receive an original image from a camera unit of the surveillance camera in a wire manner or in a wireless manner; the original image can be interpreted as an image in need of restoration. The operation processor 14 can execute the image restoration method of the present invention to increase the image quality of the surveillance image for being watched by the user or further image analyzed.

For example, the original image may be distorted or deformed to result in a distortion image because of ambient light, lens property, parameter changes of the sensor, or image processing program (which may reduce or compress the image in a process of transmitting toward the image receiver 12). According to formula 1, a symbol of Y can be represented as the original image captured by the camera unit, and a symbol of G can be represented as a distortion function, and a symbol of X can be represented as a distortion image. An inverse function of the distortion function G is computed and used as a restoration function for an image restoration program of the present invention. The restoration function can restore the distortion image X into a correct image conforming to an actual scene. According to formula 2, a symbol of $F_\theta$ can be represented as the restoration function, a symbol of Y' can be represented as the corrected image processed by the image restoration program. The restoration function Fe can be computed and acquired via neural network. The neural network can be convolutional neural network (CNN), generative adversarial network (GAN), variational auto encoders (VAE), or any possible network. A symbol of $\theta$ can be represented as a parameter of the neural network.

$$X = G(Y) \qquad \text{Formula 1}$$

$$Y' = F_\theta(X) \qquad \text{Formula 2}$$

The image restoration device 10 can utilize one or a plurality of distortion images X to execute the image restoration method of the present invention. If a number of the distortion image X is one, difference between the distortion image X and the original image Y can be analyzed to find out the parameter $\theta$ of the restoration function. If the number of the distortion images X is plural, the image restoration device 10 can find out the parameter $\theta$ of the restoration function via each of the plurality of distortion images X and one corresponding original image Y captured at the same point of time, and further can confirm whether predefined objects within the distortion images X respectively captured at different points of time are the same object. If the predefined object cannot be found within the distortion image X captured at some point of time, the image restoration program for the distortion image X captured at the said point of time can be excluded, or the distortion image X captured at a previous point of time and the distortion image X captured at a following point of time can be applied for replacement or interpolation to execute the image restoration program at the said point of time.

Figure 3:
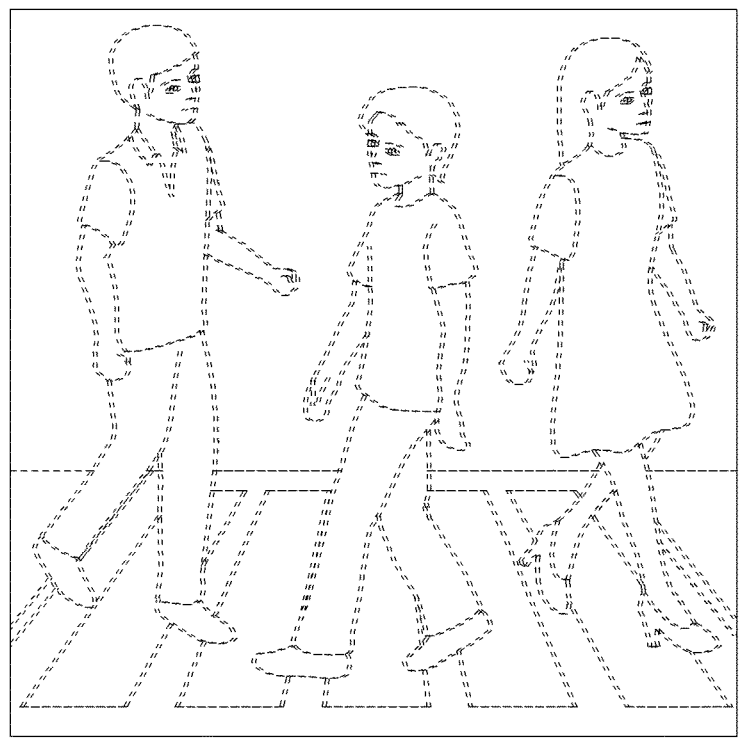
FIG. 3 to FIG. 5 are diagrams of the images captured by the image restoration device and processed in the image restoration program according to the embodiment of the present invention.
Figure 4:
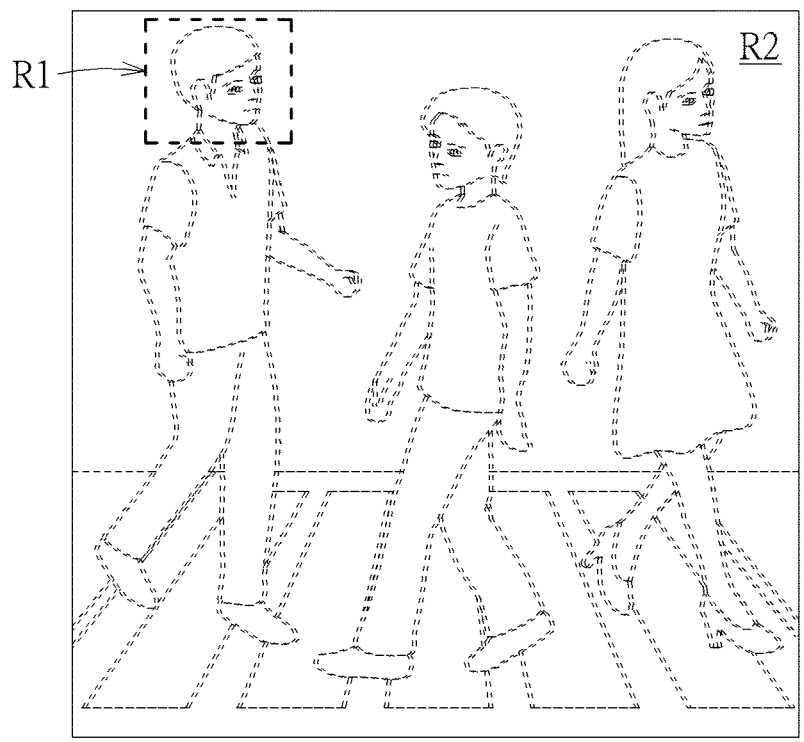
Figure 5:
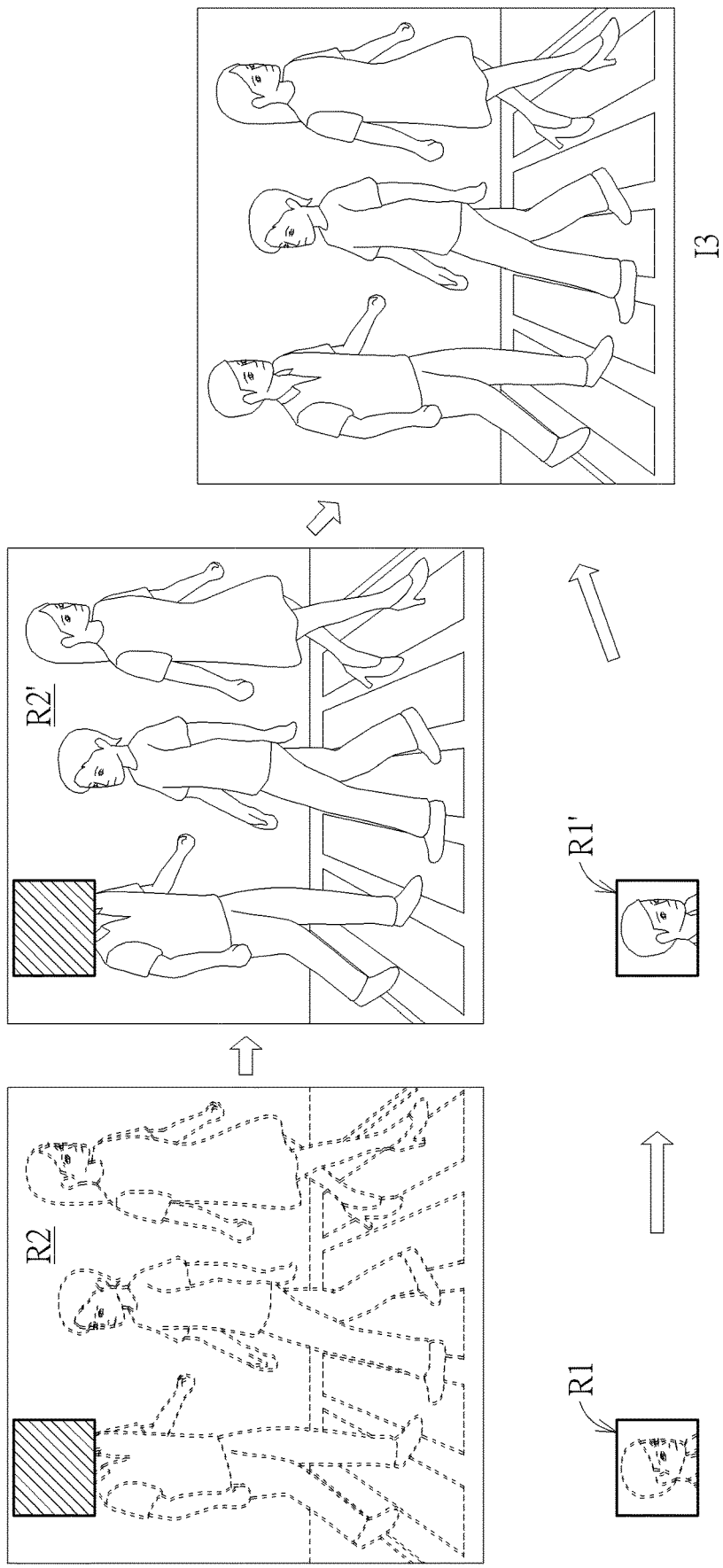

Please refer to FIG. 3 to FIG. 5. FIG. 3 to FIG. 5 are diagrams of the images captured by the image restoration device 10 and processed in the image restoration program according to the embodiment of the present invention. The image restoration method illustrated in FIG. 2 can be suitable for the image restoration device 10 shown in FIG. 1. According to the image restoration method, first, step S100 can be executed to apply an object detection/identification technology for the original image I1 acquired by the image receiver 12, so as to decide at least one region of interest R1 within the original image I1, and further to generate an analyzing image I2 having the region of interest R1 and a background region R2, as shown in FIG. 3 and FIG. 4. The original image I1 can be interpreted as the distortion image X illustrated in formula 1 and formula 2. A number and a position of the region of interest R1 can depend on a result of the object detection/identification technology, and is not limited to the embodiment shown in the figures.

Then, step S102 and step S104 can be executed to utilize a first restoration function to calibrate the region of interest R1 and generate a calibrated region of interest R1', and further to utilize a second restoration function to calibrate the background region R2 and generate a calibrated background region R2'. In step S100, the object detection/identification technology may identify a human face, a license plate or an advertisement sign, which depends on an actual demand of the surveillance camera. In the present invention, the image restoration method can analyze a category of the predefined object within the region of interest R1, such as identifying that the category of the predefined object belongs to the human face, the license plate or the advertisement sign. When the category of the predefined object is confirmed, the first restoration function relevant to the confirmed category can be selected from a database 16 of the image restoration device 10 for application in step S102.

For example, if the category of the predefined object is face information of human, the first restoration function can be a special type of the algorithm applied for the specific category of the predefined object, and the parameter $\theta$ of the neural network can conform to formula $$3; F_\theta^{face}$$

can be interpreted as the restoration function of the region of interest R1, and $$X_i^{face}$$

can be interpreted as a part of the distortion image of the region of interest R1, and $$Y_i^{face}$$

can be interpreted as the original image of the region of interest R1. The second restoration function can be an universal type of the algorithm applied for the background, and the parameter $\theta$ of the neural network can conform to formula $$4; F_\theta^{background}$$

can be interpreted as the restoration function of the background region R2, and $$X_i^{background}$$

can be interpreted as the distortion image of the background region R2, and $$Y_i^{background}$$

can be interpreted as the original image of the background region R2. A symbol of i can indicate that the image restoration method utilizes several training sets $(X_i, Y_i)$ to learn the parameters θ of the restoration function.

$$\theta = \operatorname{argmin} \sum_i \operatorname{distance}\left[F_\theta^{face}\left(X_i^{face} - Y_i^{face}\right)\right] \quad \text{Formula 3}$$

$$\theta = \operatorname{argmin} \sum_i \operatorname{distance}\left[F_\theta^{background}\left(X_i^{background} - Y_i^{background}\right)\right] \quad \text{Formula 4}$$

Final, step S106 can be executed to combine the calibrated region of interest R1' with the calibrated background region R2' in accordance with a relative position between the region of interest R1 and the background region R2 to generate a restoration image I3, as shown in FIG. 5. In the foresaid embodiment, the present invention can utilize different restoration functions to execute the image restoration program respectively for the region of interest R1 and the background region R2, and then fuse the restoration results of the region of interest R1 and the background region R2 so as to acquire preferred image restoration efficiency of the predefined object; however, application of the image restoration program is not limited to the foresaid embodiment. If following image interpretation is not affected by distortion of the background region R2, the present invention can optionally not apply the image restoration program for the background region R2, which means step S104 may be optionally excluded in the image restoration method; when step S102 is executed to utilize the first restoration function to calibrate the region of interest R1 and generate the calibrated region of interest R1', step S106 can be directly executed to combine the calibrated region of interest R1' with the background region R2 in accordance with the relative position between the region of interest R1 and the background region R2 for generating the restoration image I3 with the clear region of interest.

In step S106, a combination of the calibrated region of interest R1' and the calibrated background region R2' (or the background region R2) can be executed via several manners. For example, the present invention may acquire coordinates of an initial marking point of the region of interest R1 within the background region R2, and then analyze the calibrated region of interest R1' to find out a calibrated marking point transformed from the initial marking point, and finally align the calibrated marking point with the coordinates of the initial marking point within the background region R2, so as to combine the calibrated region of interest R1' with the calibrated background region R2' (or the background region R2). The initial marking point (which is not shown in the figures) can be a marking point manually set by the user, or can be the marking point automatically set by the image restoration device 10 in accordance with a preset rule when executing the object detection/identification technology; variation of setting the initial marking point can depend on the actual demand.

The region of interest R1 and the background region R2 can be processed by the image restoration program via different restoration functions, so that a line or a pattern located on a boundary between the region of interest R1 and the background region R2 may have errors, and can be corrected by the following manners. In the first manner, an edge of the calibrated region of interest R1' can be blurred by the image processing program, and the blurred edge of the calibrated region of interest R1' can be combined or fused with the calibrated background region R2' (or the background region R2) to provide the restoration image I3. In the second manner, an edge of the calibrated background region R2' (or the background region R2) close to the calibrated region of interest R1' can be sharpened by the image processing program, and the sharpened edge of the calibrated background region R2' (or the background region R2) can be combined or fused with the calibrated region of interest R1' to provide the restoration image I3.

It should be mentioned that the first manner can adjust the first restoration function in accordance with the calibrated background region R2' (or the background region R2), and the edge of the calibrated region of interest R1' can be blurred via the adjusted first restoration function for an adaptive combination. Accordingly, the second manner can adjust the second restoration function in accordance with the calibrated region of interest R1', and then the edge of the calibrated background region R2' (or the background region R2) can be sharpened via the adjusted second restoration function. Optimization process for the boundary between the region of interest R1 and the background region R2 is not limited to the foresaid embodiments; any method capable of fusing two regions within the image can conform to the embodiment of adaptively fusing the region of interest R1 and the background region R2 in the present invention.

The foresaid image restoration method can analyze the category of the predefined object within the region of interest R1 to select the first restoration function conforming to the analyzed category, and an actual application of selecting the category is not limited to the foresaid embodiment, For example, if the category of the predefined object is interpreted as the human face, the image restoration method of the present invention can further analyze an attribute of the category, such as the gender, the race or the decoration of the human face, or any possible attribute variation. Then, the image restoration method can select the first restoration function simultaneously relevant to the category and the attribute from the database 16, so as to accurately calibrate the region of interest R1. The image restoration method can acquire preferred parameters of the restoration function as if the category and the attribute have more diversification; variation of the category and the attribute can depend on the actual demand, and a detailed description is omitted herein for simplicity.

Figure 6:
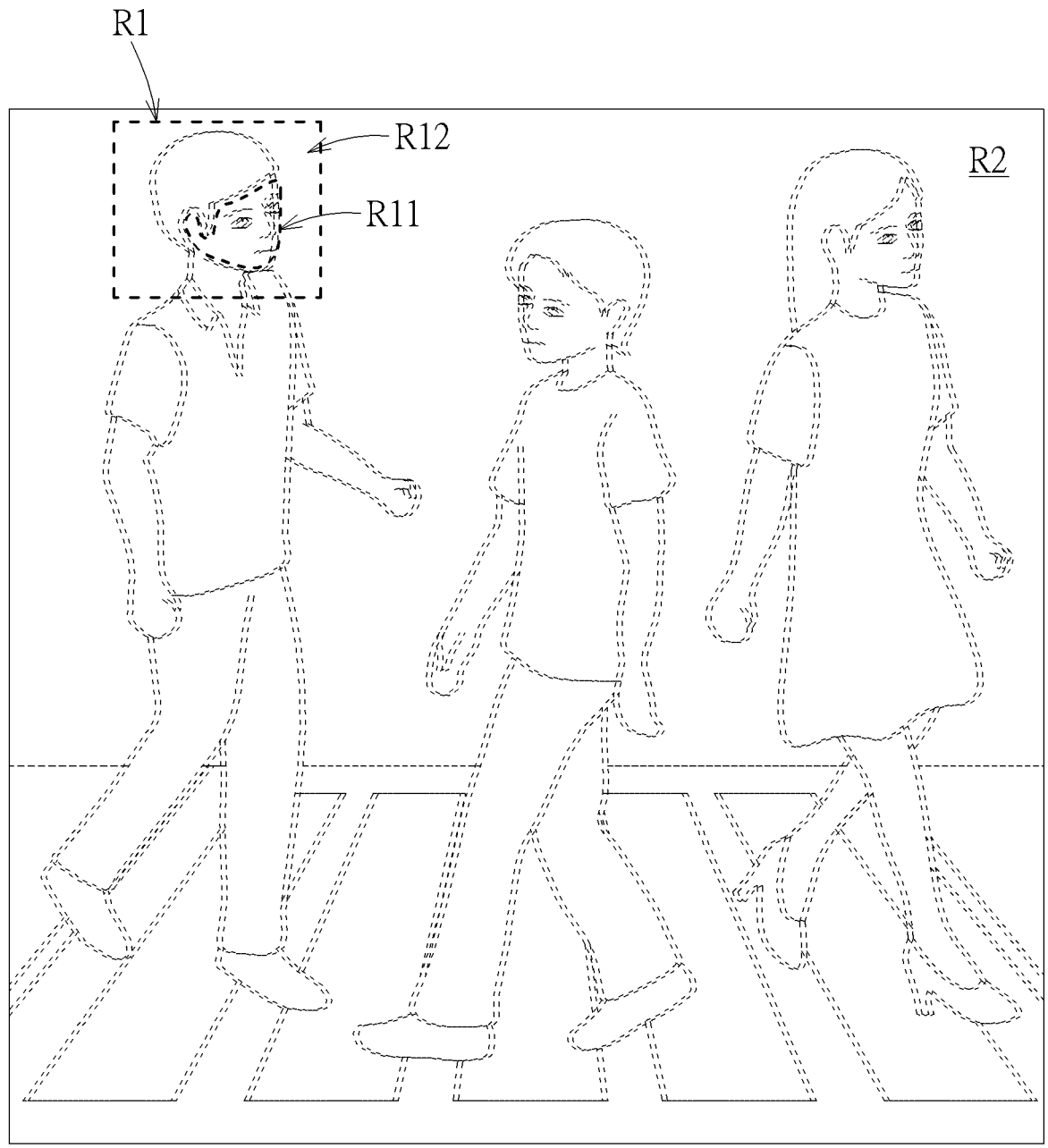
FIG. 6 is a diagram of an analyzing image in another type according to the embodiment of the present invention.

In addition, the image restoration method can further analyze the region of interest R1. Please refer to FIG. 6. FIG. 6 is a diagram of the analyzing image I2 in another type according to the embodiment of the present invention. The present invention can apply a human face detection/identification technology for the region of interest R1 to identify a human face region R11. The human face region R11 may contain facial features of the human, such as a mouth, ears, eyes and a nose, and not contain hairs and a neck of the human; the first restoration function can apply the image restoration program for the human face region R11, to ensure that the restoration image I3 can have the clear facial features. Further, the present invention may optionally divide the region of interest R1 into the human face region R11 and a non-face region R12. The human face region R11 may contain the facial features of the human, such as the mouth, the ears, the eyes and the nose; the non-face region R12 may contain the hairs, the neck and other area except the head. The first restoration function can apply the image restoration program only for the human face region R11, and the non-face region R12 can be set as the background region R2. In other possible embodiment, the non-face region R12 within the region of interest R1 may be defined as an image fusing region, and the non-face region R12 can be processed by the image restoration program for the adaptive combination, such as the foresaid clarify process or blue process; final, the human face region R11, the human face region non-face region R12 and the background region R2 can be combined or fused to generate the restoration image I3.

Figure 7:
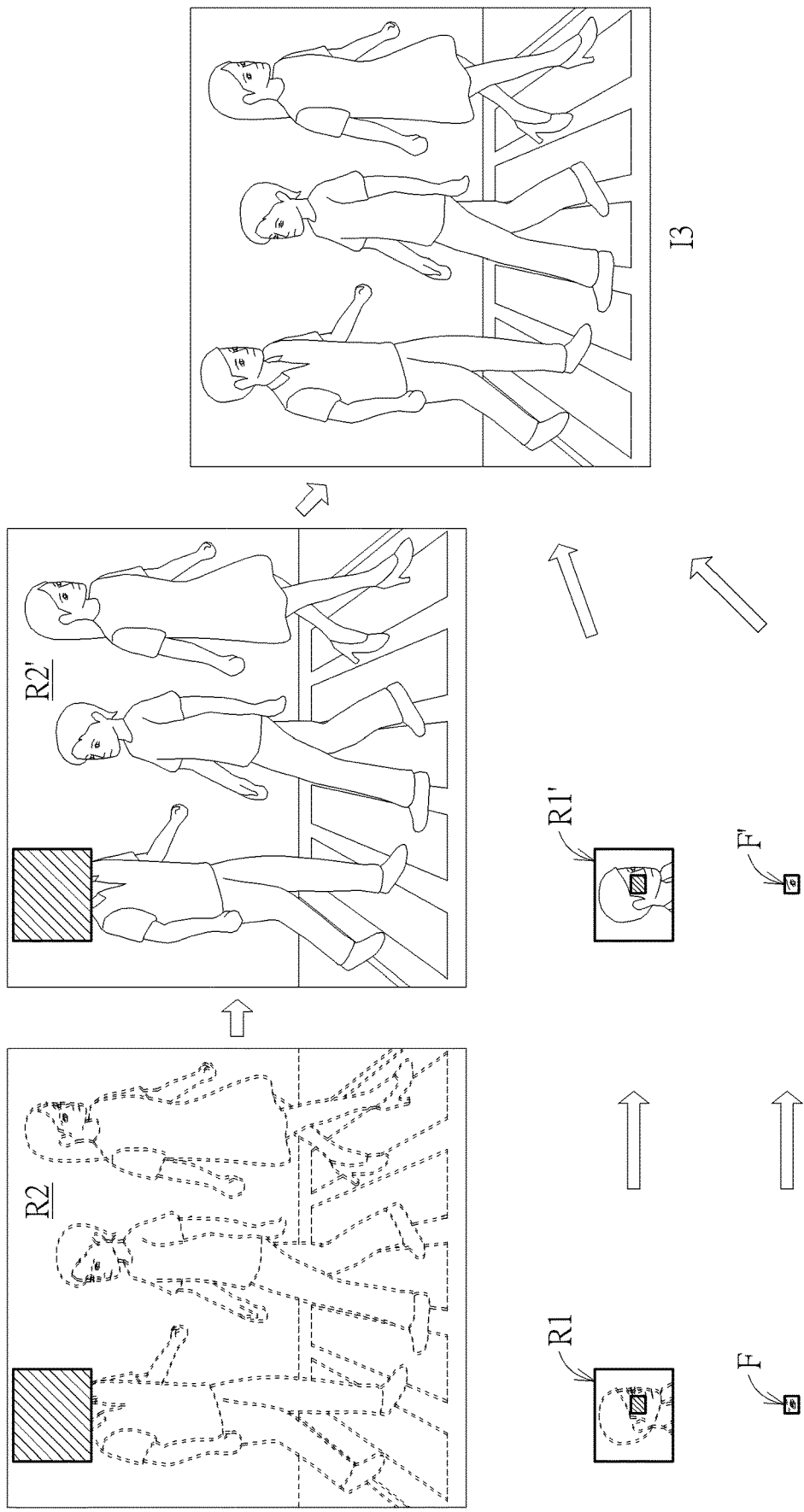
FIG. 7 is a diagram of the image acquired from the image restoration device and processed in the image restoration program according to another embodiment of the present invention.

Please refer to FIG. 7. FIG. 7 is a diagram of the image acquired from the image restoration device 10 and processed in the image restoration program according to another embodiment of the present invention. The image restoration method of the present invention can optionally detect an important predefined feature F within the region of interest R1; for example, if the category of the predefined object is interpreted as the human face, the predefined feature F can be the eyes, the nose, the mouth, or eyebrows, which depends on the actual demand. When the predefined feature F is detected, the image restoration method can select a feature restoration function relevant to the predefined feature F from the database 16, and utilize the selected feature restoration function to calibrate the predefined feature F and generate a calibrated predefined feature F'; the present invention can analyze the predefined feature F, or select the suitable feature restoration function from the database 16 in accordance with the preset rule. Then, the image restoration method can combine or fuse the calibrated predefined feature F' with the calibrated region of interest R1' and the calibrated background region R2' (or the background region R2) in accordance with the relative position between the predefined feature F and the region of interest R1, so as to provide the clear restoration image I3.

The foresaid embodiment can utilize different restoration functions to respectively calibrate the predefined feature F and the region of interest R1, so as to accurately restore a facial range and special parts (such as the eyes, the nose, the mouth or the eyebrows) of the human face in accordance with feature difference, and the actual application is not limited to the foresaid embodiment. For example, when the predefined feature F is detected, the image restoration method of the present invention can optionally set different weights respectively to the predefined feature F and the region of interest R1, and the weights are used to adjust weighting ratios of the predefined feature F and the region of interest R1 within the first restoration function; then, the first restoration function adjusted by the weighting ratios can be used to calibrate the region of interest R1 and the predefined feature F to generate the calibrated region of interest R1', and the calibrated region of interest R1' can be combined or fused with the calibrated background region R2' (or the background region R2) via step S106 for generating the clear restoration image I3. The parameter θ of the first restoration function can conform to formula 5. $F_\theta^{feat}$ can be interpreted as the feature restoration function of the predefined feature F. $X_i^{fear}$ can be interpreted as a part of the distortion image of the predefined feature F. $Y_i^{feat}$ can be interpreted as the original image of the predefined feature F. $W^{feat}$ can be interpreted as the weighting value (which means a predefined feature predefined feature weight) of a distance between parameters of the predefined feature F before and after restoration. $W^{face}$ can be interpreted as the weighting value (which means a region weight of interest) of a distance between parameters of the region of interest R1 before and after restoration.

$$\theta = \mathrm{argmin} \sum_i \left[ \mathrm{distance}\ \left(F_\theta^{face}\left(X_i^{face}\right) - Y_i^{face}\right) * W^{face} + \sum_{feat} \mathrm{distance}\ \left(F_\theta^{feat}\left(X_i^{feat}\right) - Y_i^{feat}\right) * W^{feat} \right] \quad \text{Formula 5}$$

The predefined feature weight $W^{feat}$ can execute weight correction of the predefined feature F through a restoration result of the feature restoration function $$F_\theta^{feat}.$$

The region weight of interest $W^{face}$ can execute the weight correction of the region of interest R1 through a restoration result of the restoration function $$F_\theta^{face}.$$

when foresaid correction results are acquired, the image restoration method of the present invention can utilize the weight correction of the foresaid restoration results to generate the adjusted first restoration function.

Further, when the predefined feature F is detected, the image restoration method of the present invention can optionally set different weights respectively to a bounding box of the predefined feature F and the region of interest R1, and the foresaid weights are used to respectively adjust the weighting ratios of the bounding box of the predefined feature F and the region of interest R1 within the first restoration function; then, the first restoration function adjusted by the weighting ratios can be utilized to calibrate the region of interest R1 and the predefined feature F and then generate the calibrated region of interest R1', and the calibrated region of interest R1' can be combined or fused with the calibrated background region R2' (or the background region R2) via step S106 to generate the clear restoration image I3. The parameter θ of first restoration function can conform to formula 6. $Det^{feat}$ can be interpreted as a function of detecting and computing coordinates and dimensions of the bounding box of the predefined feature $$F.\ W_{det}^{feat}$$

can be interpreted as the weighting value (which means the feature bounding box weight) of a distance between coordinates of the bounding box before and after restoration. $W^{face}$ can be interpreted as the weighting value (which means the region weight of interest) of a distance between parameters of the region of interest R1 before and after restoration.

$$\theta = \operatorname{argmin} \sum_i \left[ \text{distance}\ \left(F_\theta^{face}(X_i^{face}) - Y_i^{face}\right) * W^{face} \right. \quad \text{Formula 6}$$
$$\left. + \sum_{feat} \text{distance}\ \left(Det^{feat}(F_\theta^{feat}(X_i^{feat})) - Det^{feat}(Y_i^{feat})\right) * W^{feat} \right]$$

The feature bounding box weight $$W_{det}^{feat}$$

can execute the weight correction of the predefined feature F through the restoration results of the bounding box detection function $Det^{feat}$ and the feature restoration function $$F_\theta^{feat}.$$

The region weight of interest $W^{face}$ can execute the weight correction of the region of interest R1 through the restoration result of the related restoration function. As the foresaid correction results are acquired, the image restoration method of the present invention can utilize the weight correction of the restoration results to generate the adjusted first restoration function. In the present invention, the image restoration method can analyze the bounding box of the predefined feature F, or accordingly select the bounding box detection function $Det^{feat}$ and the feature restoration function $$F_\theta^{feat}$$

from the database 16 in accordance with the preset rule.

Beside, in another possible embodiment, the present invention can merge the foresaid two embodiments in accordance with the actual demand. For example, when the predefined feature F is detected and the bounding box is set, the present invention can set different weights respectively to the predefined feature F, the bounding box of the predefined feature F, and the region of interest R1, and respectively adjust the weighting ratios of the predefined feature F, the bounding box of the predefined feature F, and the region of interest R1 within the first restoration function. Then, the first restoration function adjusted by the weighting ratios can be used to calibrate the predefined feature F, the related bounding box, and the region of interest R1 so as to generate the calibrated region of interest R1'; the calibrated region of interest R1' can be combined or fused with the calibrated background region R2' (or the background region R2) via step S106 to generate the clear restoration image I3. The parameter θ of the first restoration function can conform to formula 7. Other symbols can be the same as ones in formula 5 and formula 6, and the detailed description is omitted herein for simplicity.

$$\theta = \operatorname{argmin} \sum_i \left( \text{distance}\ \left(F_\theta^{face}(X_i) - Y_i\right) * W^{face} + \right. \quad \text{Formula 7}$$
$$\sum_{feat} \text{distance}\ \left(F_\theta^{feat}(X_i^{feat}) - Y_i^{feat}\right) * W^{feat} +$$
$$\left. \sum_{feat} \text{distance}\ \left(Det^{feat}(F_\theta^{feat}(X_i^{feat})) - Det^{feat}(Y_i^{feat})\right) * W_{det}^{feat} \right]$$

In conclusion, the image restoration device and the image restoration method of the present invention can utilize different restoration functions to respectively restore the region of interest and the background region within the distortion image, or utilize different weights to adjust the weighting ratios of the region of interest and the background region within the restoration function, so that the category and the attribute of the region of interest can be identified and analyzed to acquire the preferred image restoration efficiency. The image restoration device of the present invention can utilize the object detection/identification technology to find out whether the region of interest conforming to the specific category and/or the specific attribute exists in the original image, and the image restoration method can be executed in response to the eligible region of interest; besides, the present invention may analyze whether the control command provided by the input interface, such as the mouse or the keyboard, points toward the region of interest, and then execute the image restoration method when the control command points toward the region of interest. In addition, the image restoration method and the image restoration device of the present invention can improve the clarity of the region of interest within the image or improve the distortion degree of the image on the premise of economizing image data size or video data rate, so as to effectively solve conventional drawbacks of sacrificing the image quality in order to reduce the image data size or the video data rate, while taking into account advantages of small image data size and low video data rate and high resolution of the image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image restoration method applied to an image restoration device with an image receiver and an operation processor, the image restoration method comprising:
   the operation processor acquiring an analyzing image containing at least one region of interest and a background region received by the image receiver;
   the operation processor detecting a predefined feature within the at least one region of interest;
   the operation processor utilizing a region weight of interest and at least one of a predefined feature weight and a feature bounding box weight to respectively adjust weighting ratios of the at least one region of interest to at least one of the predefined feature and a bounding box of the predefined feature within a first restoration function;

the operation processor utilizing the adjusted first restoration function to calibrate the at least one region of interest and at least one of the predefined feature and the bounding box for generating at least one calibrated region of interest; and the operation processor combining the at least one calibrated region of interest with the background region via at least one relative position between the at least one region of interest and the background region for providing a restoration image.

2. The image restoration method of claim 1, further comprising:

the operation processor utilizing a second restoration function to calibrate the background region and generate a calibrated background region; and the operation processor combining the at least one calibrated region of interest with the calibrated background region via the at least one relative position between the at least one region of interest and the background region for providing the restoration image.

3. The image restoration method of claim 2, further comprising:

the operation processor adjusting the second restoration function in accordance with the at least one calibrated region of interest;

the operation processor utilizing the second restoration function to apply an image processing program for an edge of the calibrated background region close to the at least one calibrated region of interest; and the operation processor fusing the edge with the at least one calibrated region of interest to combine the at least one calibrated region of interest and the calibrated background region.

4. The image restoration method of claim 1, further comprising:

the operation processor acquiring coordinates of an initial marking point of the at least one region of interest within the background region;

the operation processor determining a calibrated marking point of the at least one calibrated region of interest transformed from the initial marking point; and the operation processor aligning the calibrated marking point with the coordinates to combine the at least one calibrated region of interest and the background region.

5. The image restoration method of claim 1, further comprising:

the operation processor applying an image processing program for an edge of the at least one calibrated region of interest; and the operation processor fusing the edge with the background region to combine the at least one calibrated region of interest and the background region.

6. The image restoration method of claim 1, further comprising:

the operation processor analyzing a category of a predefined object within the at least one region of interest;

the operation processor selecting the first restoration function relevant to the category from a database; and the operation processor utilizing the first restoration function to calibrate the at least one region of interest.

7. The image restoration method of claim 6, further comprising:

the operation processor analyzing an attribute of the category; and the operation processor selecting the first restoration function relevant to the category and the attribute from the database to calibrate the at least one region of interest.

8. The image restoration method of claim 1, further comprising:

the operation processor detecting a predefined feature within the at least one region of interest;

the operation processor selecting a feature restoration function relevant to the predefined feature from a database to calibrate the predefined feature and generate a calibrated predefined feature; and the operation processor combining the calibrated predefined feature and the at least one calibrated region of interest via a relative position between the predefined feature and the at least one region of interest.

9. The image restoration method of claim 1,
wherein the predefined feature weight is a weighting value of a distance between parameters of the predefined feature before and after restoration, the region weight of interest is a weighting value of a distance between parameters of the at least one region of interest before and after restoration.

10. The image restoration method of claim 9, wherein the predefined feature weight is weight correction of the predefined feature through a restoration result of a feature restoration function, the region weight of interest is weight correction of the at least one region of interest through a restoration result of the first restoration function, the image restoration method utilizes the weight correction of the restoration results to acquire the adjusted first restoration function.

11. The image restoration method of claim 10, wherein the image restoration method analyzes the predefined feature to accordingly select the feature restoration function from a database.

12. The image restoration method of claim 1,
wherein the feature bounding box weight is a weighting value of a distance between coordinates of the bounding box before and after restoration, the region weight of interest is a weighting value of a distance between parameters of the at least one region of interest before and after restoration.

13. The image restoration method of claim 12, wherein the feature bounding box weight is weight correction of the predefined feature through a bounding box detection function and a restoration result of a feature restoration function, the region weight of interest is weight correction of the at least one region of interest through a restoration result of the first restoration function, the image restoration method utilizes the weight correction of the restoration results to acquire the adjusted first restoration function.

14. The image restoration method of claim 13, wherein the image restoration method analyzes the predefined feature to accordingly select the bounding box detection function and the feature restoration function from a database.

15. The image restoration method of claim 1,
wherein the predefined feature weight is a weighting value of a distance between parameters of the predefined feature before and after restoration, the feature bounding box weight is a weighting value of a distance between coordinates of the bounding box before and after restoration, the region weight of interest is a weighting value of a distance between parameters of the at least one region of interest before and after restoration.

16. The image restoration method of claim 1, further comprising:

the operation processor applying an object detection/identification technology for an original image to decide the at least one region of interest and generate the analyzing image;

the operation processor analyzing whether a control command points toward the at least one region of interest; and the operation processor executing calibration of the first restoration function so as to generate the restoration image when the control command points toward the at least one region of interest.

17. An image restoration device, comprising:

an image receiver adapted to receive an original image; and an operation processor electrically connected to the image receiver, the operation processor being adapted to transform the original image into an analyzing image containing at least one region of interest and a background region, detect a predefined feature within the at least one region of interest, utilize a region weight of interest and at least one of a predefined feature weight and a feature bounding box weight to respectively adjust weighting ratios of the at least one region of interest to at least one of the predefined feature and a bounding box of the predefined feature within a first restoration function, utilize the adjusted first restoration function to calibrate the at least one region of interest and at least one of the predefined feature and the bounding box for generating at least one calibrated region of interest, and combine the at least one calibrated region of interest with the background region via at least one relative position between the at least one region of interest and the background region for providing a restoration image.

18. The image restoration device of claim 17, wherein the operation processor is further adapted to utilize a second restoration function to calibrate the background region and generate a calibrated background region, and combine the at least one calibrated region of interest with the calibrated background region via the at least one relative position between the at least one region of interest and the background region for providing the restoration image.

19. The image restoration device of claim 17, wherein the predefined feature weight is a weighting value of a distance between parameters of the predefined feature before and after restoration, the region weight of interest is a weighting value of a distance between parameters of the at least one region of interest before and after restoration.

20. The image restoration device of claim 17, wherein the operation processor is further adapted to apply an object detection/identification technology for an original image to decide the at least one region of interest and generate the analyzing image, analyze whether a control command points toward the at least one region of interest, and execute calibration of the first restoration function to generate the restoration image when the control command points toward the at least one region of interest.

* * * * *